Feb. 15, 1938.   J. W. MORSE   2,108,383
METHOD FOR DETERMINING THE ALIGNMENT OF DIRIGIBLE VEHICLE WHEELS
Original Filed Sept. 21, 1931   4 Sheets-Sheet 1
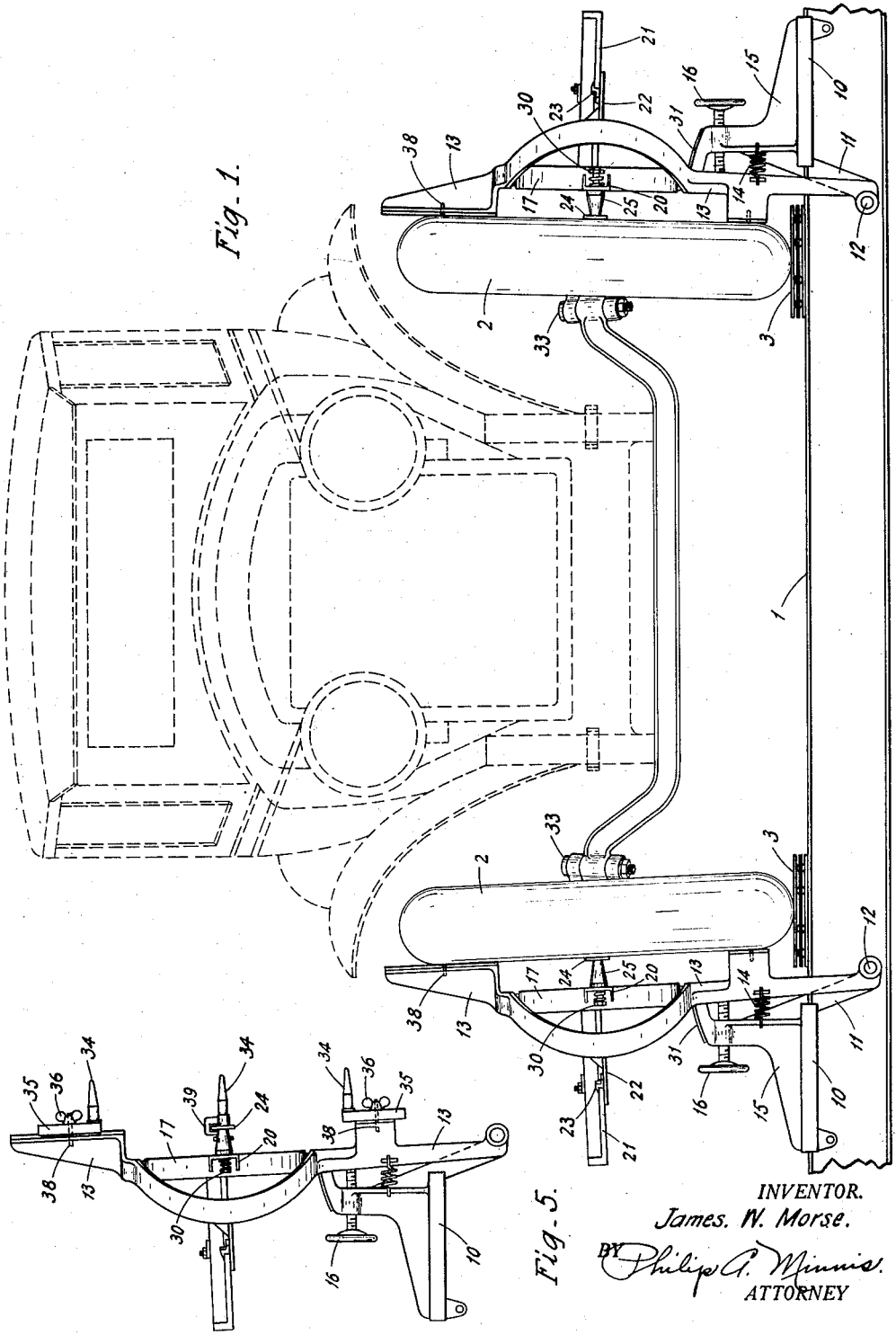
INVENTOR.
James W. Morse.
ATTORNEY

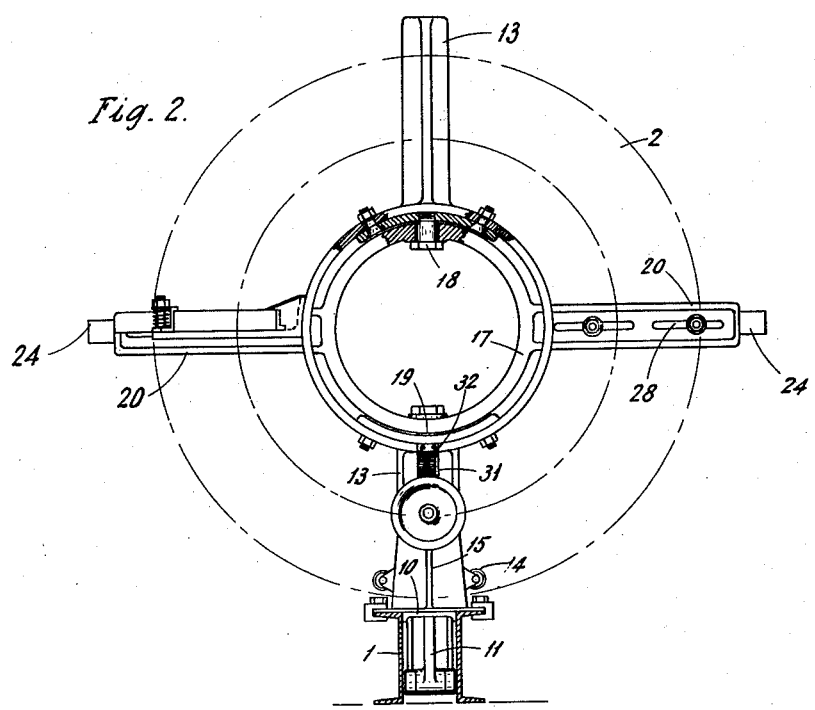

Feb. 15, 1938.  J. W. MORSE  2,108,383
METHOD FOR DETERMINING THE ALIGNMENT OF DIRIGIBLE VEHICLE WHEELS
Original Filed Sept. 21, 1931  4 Sheets-Sheet 3
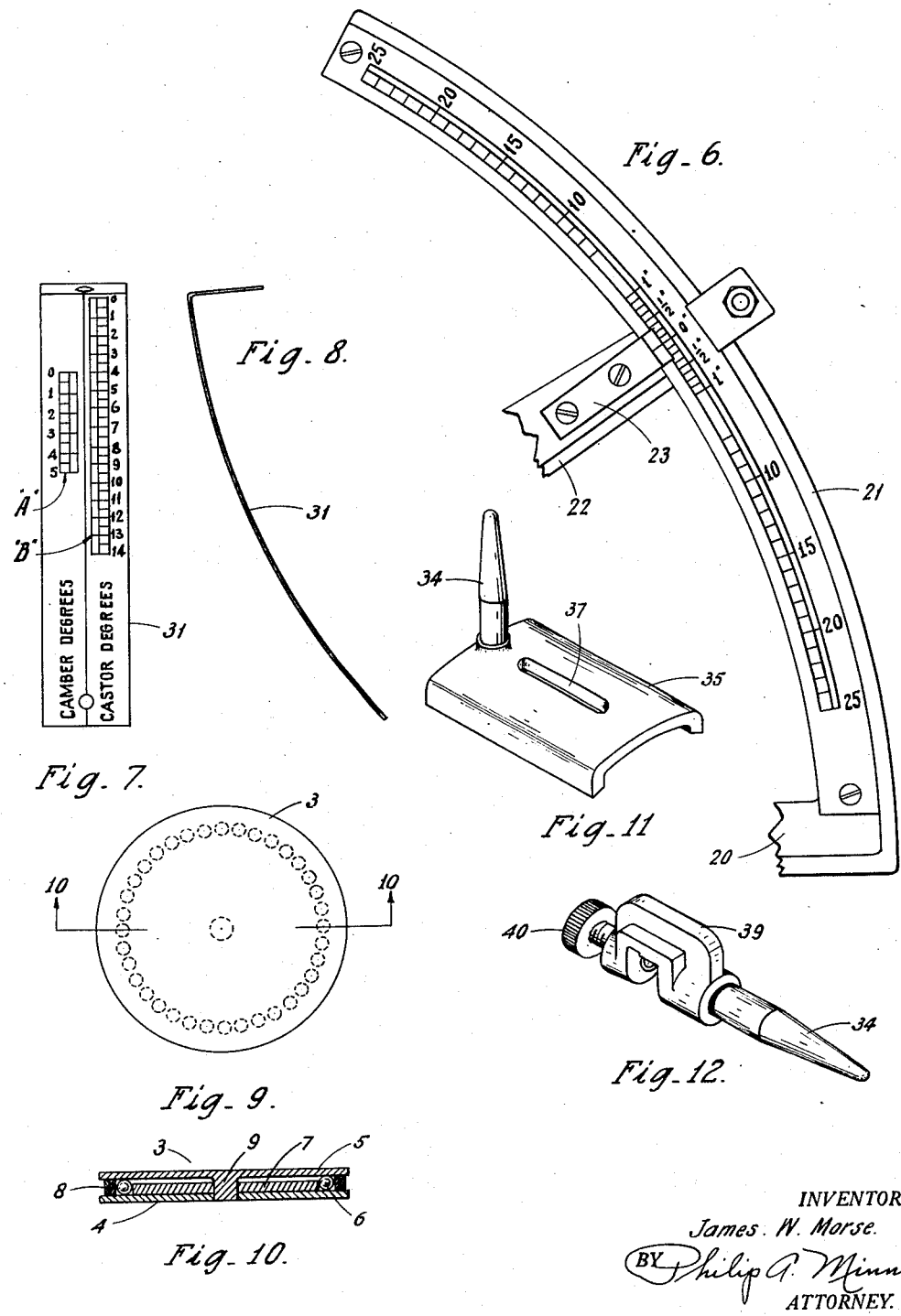
INVENTOR.
James. W. Morse.
BY Philip G. Minnis
ATTORNEY.

Feb. 15, 1938. J. W. MORSE 2,108,383
METHOD FOR DETERMINING THE ALIGNMENT OF DIRIGIBLE VEHICLE WHEELS
Original Filed Sept. 21, 1931   4 Sheets-Sheet 4

INVENTOR.
James. W. Morse.
BY Philip G. Minnis
ATTORNEY.

Patented Feb. 15, 1938

2,108,383

UNITED STATES PATENT OFFICE 2,108,383

METHOD FOR DETERMINING THE ALIGNMENT OF DIRIGIBLE VEHICLE WHEELS

James W. Morse, Lansing, Mich., assignor to Food Machinery Corporation, San Jose, Calif., a corporation of Delaware Original application September 21, 1931, Serial No. 564,097. Divided and this application May 12, 1936, Serial No. 79,371

3 Claims. (Cl. 33—203)

This invention relates to the art of aligning dirigible vehicle wheels such as the front wheels of automotive vehicles, and has a particular reference to a novel method of determining the caster of such wheels.

This application is a division of my copending application, Serial #564,097, filed September 21, 1931.

It is practically the universal practice in the automotive industry today to journal the front wheels of automotive vehicles on spindles pivotally secured to the outer ends of the axle by means of pivot pins commonly known as knuckle pins or king pins. These king pins are ordinarily inclined somewhat from the vertical towards the rear of the vehicle in order to provide for stabilization and ease of steering, and this angle of inclination of the king pins from the vertical is known as the "caster".

It is also the practice to incline the wheel spindles slightly downwardly and forwardly so that the wheels are tilted outwardly at their tops and their front edges are inclined inwardly. These characteristics of the wheels are also designed to promote ease of steering and are known as camber and toe in, respectively.

Another characteristic of the front wheels is that they are so interconnected that there is a difference in the angles through which they are turned when the vehicle is rounding a curve. This difference prevents undue wear on tires and is known as toe out on the curve.

Under the severe conditions of usage to which most automotive vehicles are subjected it is not surprising that their front wheels become misaligned in the course of time; that is to say, their caster, camber, toe in, and toe out on the curve characteristics vary, due to the distortion of the axle, tie rod, king pins, or wheel spindles. The effect of these variations is revealed in undue wear on tires, difficult steering, and vibration of the wheels commonly referred to as "shimmying", and consequently it is necessary to check the alignment characteristics of the wheels at intervals and readjust them, if necessary, to bring them back into proper alignment.

Of the several alignment characteristics enumerated, the one most difficult of measurement is caster, and the methods of measuring caster heretofore known have been unsatisfactory in general for the reason that they are not adapted to measure the caster angle directly, but complicated computation must be restorted to, or the use of comparative charts is required. Furthermore, the apparatus for carrying out these methods is necessarily complicated and delicate, or else inaccurate in the results obtained, and does not readily lend itself to incorporation with apparatus for determining the other alignment characteristics. It has, therefore, been necessary heretofore to make use of more than one device in order to measure all the alignment characteristics of a dirigible wheel, so that a complete set of equipment is not only complicated and expensive, but requires a large amount of time and labor to operate.

In the practice of my novel method of measuring caster I take advantage of the fact that when a dirigible wheel is turned about its king pin its angle of inclination from the vertical varies, due to the caster. I have discovered that the variation of the inclination of the wheel from the vertical, when turned through an angle, bears a direct relation to the angle of caster; and further that this variation can be measured in a plane perpendicular to the plane of the wheel when in straight ahead position, and by the use of suitable units of measurement the angle of caster can be directly measured without the use of charts or the necessity of making complicated computations.

I have also devised a novel form of apparatus for carrying out this method and have found that the same may be of very simple and sturdy construction without in any way sacrificing accuracy. Furthermore, the apparatus lends itself very readily to incorporation with apparatus for measuring other alignment characteristics. This apparatus forms the subject matter of the parent application above referred to.

It is, therefore, a general object of this invention to provide a method of determining the caster of dirigible vehicle wheels which does not require the use of charts nor necessitate the making of complicated computations.

Another object is to devise a method of determining the caster of dirigible vehicle wheels by which the caster may be determined by measuring the variation of inclination of the wheel when turned from one position to another, the measurements being taken in a plane perpendicular to the plane of the wheel when in straight ahead position.

Additional objects and advantages will become apparent as the description proceeds in connection with the accompanying drawings, it being understood that the drawings are illustrative only and that various changes and modifications may be resorted to without departing from the spirit or scope of the invention, and I deem myself entitled to all such changes and modifications as fall within the scope of the claims hereto appended.

Referring to the drawings, wherein like reference characters denote like parts throughout the several views:

Figure 1 is a front view of a wheel aligning apparatus embodying my invention, and illustrating an automobile thereon and the alignment measuring mechanism in operative engagement therewith.

Figure 2 is a side elevation of one of the alignment measuring assemblies, some of the parts being shown in section to better illustrate certain features of construction.

Figure 3 is a plan view of the alignment measuring assembly shown in Figure 2, illustrating it as applied to a vehicle wheel.

Figure 4 is a sectional view taken along the line 4—4 of Figure 3 and illustrating in detail the manner of mounting the adjustable gauge plates.

Figure 5 is a front view of one of the alignment assemblies shown in Figures 1 to 3, illustrating the application thereto of removable gauging pins adapted to be used for taking measurements from the wheel felly.

Figure 6 is a plan view of the arcuate scale carried by the horizontal gauging arms.

Figure 7 is a plan view of one of the camber and caster scales.

Figure 8 is a side elevation of the scale shown in Figure 7.

Figure 9 is a plan view of one of the turntables which support the vehicle wheels undergoing test.

Figure 10 is a sectional elevation taken along the line 10—10 of Figure 9.

Figure 11 is a perspective view of one of the gauging pins used with the vertical gauging members when measurements are to be taken from the wheel felly.

Figure 12 is a perspective view of one of the gauging pins used with the horizontal gauging plates when measurements are to be taken from the wheel felly.

Figure 13:
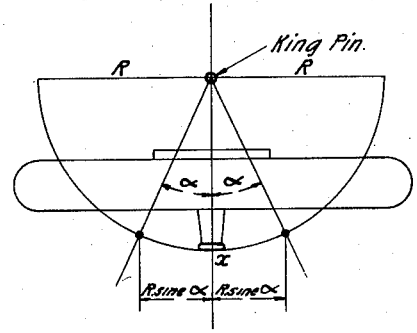
Figure 13 is a diagrammatic plan view of a dirigible vehicle wheel illustrating certain characteristics thereof.

Referring to Figure 1, the apparatus illustrated includes a pair of opposed alignment measuring assemblies mounted upon a supporting beam or track 1. The track 1 is preferably embedded in a floor with its top substantially flush with the floor level so that a vehicle may be driven thereon, or suitable approach ramps for the vehicle wheels 2 may be provided if desired. A pair of turntables indicated generally at 3 are carried by the track 1 and are spaced apart a sufficient distance so that they can receive the vehicle wheels.

As best seen in Figures 9 and 10, each turntable comprises a lower or base plate 4 secured to the track 1 and an upper plate 5 between which is disposed a plurality of ball bearings 6 held in place between the retaining ring 7 and the flange 8 depending from the underside of the plate 5. The upper plate is provided with a downwardly depending shaft 9 which extends through the ring 7 and an orifice in the fixed plate 4 whereby the parts are held in position. This turntable construction permits easy turning of the vehicle wheels resting thereon without the necessity of jacking up the axle.

Since the two alignment measuring assemblies are identical in construction, the description of one will suffice for both. Each assembly is carried by a base member 10 which is slidably mounted on the track 1 so that it may be moved toward or away from a wheel resting on the turntable 3. The base member 10 is provided with a downwardly projecting supporting arm 11, to which at 12 is pivotally secured the upright gauging member 13. A pair of retractile coil springs 14 secured at their opposite ends to the gauging member 13 and the upright 15 carried by the base member, serve to hold the gauging member against an adjustable hand screw 16. By adjusting the hand screw the gauging member 13 may be tilted about its pivot 12 to bring it into parallelism with the outer face of the vehicle wheel 2.

As may be seen, the central portion of the gauging member 13 is formed of two semi-circular sections which, as best seen in Figure 3, are set at an angle to each other for a purpose to be explained. A ring 17 is pivotally mounted within the semi-circular sections of the gauging member 13 by means of the pivots 18 and 19, located at the junctions of the semi-circular sections. The ring 17 is provided with a pair of horizontal arms 20 projecting from opposite sides thereof, and one of these arms carries the arcuate scale 21 with which cooperates an indicator arm 22 mounted on one of the semi-circular sections of the gauging member 13. By reason of the angular relation of the semi-circular portions of the gauging member it will be seen that sufficient clearance is provided for the arms 20 to permit of a considerable degree of rotation of the ring 17 carrying the arms therewith, so that the arms may be placed in horizontal parallelism with the outer face of the vehicle wheel. When this is done the position of the wheel is indicated on the scale 21 by the indicator 23 carried by the indicator arm 22.

In order to permit the application of the apparatus to vehicle wheels of all sizes, without making the arms 20 so long as to be unwieldy, each arm is provided with a gauge plate 24 adjustably secured thereto. Each gauge plate 24 carries on its rear surface a pair of studs 25, each of which has a portion of its length turned down as at 26 so as to form a shoulder 27. The portion 26 of the studs are threaded and pass through elongated slots 28 provided in the arms 20. Springs 29 surround the stud portions 26 and bear at their ends against the inner surfaces of the arms 20 and the rear surfaces of nuts 30 screwed onto the stud portions 26. By this construction the gauge plates may be shifted back and forth to the extent of the length of the slots 28, thus varying the effective length of the arms 20.

A second arcuate scale 31 is mounted upon the upper curved surface of the upright 15 in cooperative relation with an indicator 32 carried by the gauging member 13. The center of curvature of the scale 31 is located at the center of the pivot 12 and this scale carries two sets of graduations indicated at A and B.

The graduations A represent degrees of camber and the spacing of these graduations may easily be determined by computation. For example, if the radius of curvature of the scale is $r$ inches the spacing of the graduations will be $$\frac{\pi r}{180}$$

inches for each degree.

The graduations B represent degree of caster. The spacing of these graduations may be determined either mathematically or by trial and the trial method will first be described. This method, briefly stated, consists in placing one of the alignment assemblies into parallelism with the outer face of a vehicle wheel having a known caster, marking the position of the indicator 32 on the scale 31 and then turning the wheel to a different position and marking the new position of the indicator 32 on the scale 31 after the aligning assembly has again been placed in parallelism with the outer face of the wheel in this position. The distance between the marks on the scale 31 will thus represent the number of degrees of caster, and any number of graduations using this spacing may then be marked as desired so that the caster of any wheel which is thereafter tested may be read on the scale.

When the first mark is made on the scale 31 in accordance with the above described method, the vehicle wheel may be in any desired position, and the wheel may be turned to any other position to secure the second mark. In order, however, to secure as large a spacing for the graduations as possible, it is desirable that the marks be made as near the respective turning limits of the wheel as practicable. As will be seen, in order that accurate caster tests may be made on other wheels with the scale derived by the above method, the tests of such other wheels must be carried out by turning them through the same angle that the original wheel is turned through when the scale is derived. Since the average maximum turning angle of most dirigible vehicle wheels is about 25 degrees to each side of straight ahead position, or a total of 50 degrees in all, this angle is the most desirable to use in deriving the scale. As explained, however, this particular angle is selected for convenience only and any other angle may be used if desired.

In deriving the caster scale by the above method the first step is to select a vehicle having a known king pin caster which for the sake of illustration we will assume to be two degrees. This value is illustrative only and a vehicle having any other known king pin caster might be selected as well. The vehicle is then driven into testing position on the aligning apparatus—that is to say, with its front wheels resting on the turntables 3. The wheels are then preferably turned to one side of their straight ahead position. As explained above, the most desirable angle through which to turn the wheel is 25 degrees.

In order to determine when the wheel is turned 25 degrees from its straight ahead position, the aligning assembly is moved up to the wheel and the hand wheel 16 is adjusted until the gauge member 13 contacts with the outer face of the wheel both at the top and bottom. As will be apparent, when the gauge member 13 is in this position, the horizontal arms 20 will also be parallel with the wheel and the gauge plate 24 will be in contact with the opposite sides of the wheel. When the wheel is turned through 25 degrees from its straight ahead position and the gauge member 13 and gauge plate 24 are maintained in parallelism with the wheel, the indicator 23 will indicate 25 degrees on the scale 21. The position of the indicator 32 is now marked on the arcuate scale 31.

The vehicle wheel 2 is then turned to a different position, which as explained above is desirably to the opposite side of straight ahead position and to an angle corresponding to the original angle, which we have taken to be 25 degrees. Due to the caster of the king pin 33 the inclination of the wheel from the vertical will change when the wheel is thus turned, and it will, therefore, be necessary to readjust the position of the aligning assembly to bring the gauging member 13 and the gauge plates 24 back into parallelism with the face of the wheel. When this readjustment is made it will be found that the indicator 32 has assumed a new position on the scale 31 and this new position is now marked on the scale 31.

The variation of inclination of the wheel 2 when turned from one position to another is directly proportional to the caster angle so that the distance between the two marks which we have made on the scale 31 represents a caster of two degrees. It is obvious that half of this distance is the proper spacing of the graduations for one degree of caster. Knowing the spacing as many graduations may be put on the scale 31 as desired. The graduations may be subdivided as desired to indicate fractional degrees.

By actual trial with an aligning assembly whose scale 31 had a radius of 14.326 inches, it has been found that the spacing of the graduations is .233 inch for all wheels when turned from a position 25 degrees on one side of their straight ahead position to a position 25 degrees to the opposite side of their straight ahead position. Since the length of an arc whose radius is 14.326 inches and which subtends an angle of one degree at the center of the arc is $$\frac{2\cdot\pi\cdot 14.326}{360}=.25 \text{ inch,}$$

then the spacing which I have found to be correct is $$\frac{.233}{25}=.932$$

of the length of arc whose radius is the same as the radius of the scale and which subtends an angle of one degree at the center of the arc. This factor .932 can, therefore, be used as a correction factor for determining the spacing of the graduations in an apparatus having a scale whose radius is some other length than 14.326 inches. For example, supposing it is desired to construct an aligning device in which the radius of the scale 31 about the pivot 12 is 20 inches. To find the spacing of the graduations for such a scale it is only necessary to determine the length of arc whose radius is 20 inches and which subtends an angle of one degree at the center of the arc and then multiply that length by .932. Thus the spacing of the graduations would be $$\frac{2\cdot\pi\cdot 20.932}{360}=.325 \text{ inch}$$

The above described method of determining the spacing of the caster scale graduations has the disadvantage that it is often difficult to measure with accuracy the distance between the marks referred to and, moreover, it is necessary to select a vehicle wheel having a known caster, so that it is desirable to check this method mathematically, and such method will now be described.

In order to determine mathematically the spacing of the graduations on the caster scale, which will permit the caster angle to be read directly therefrom, let it be supposed that the distance from the pivot 12 to the face of the scale 31 is $r$ inches; that is to say, $r$ represents the radius of the arc of the scale. The circumference of a circle having such a radius would be $2\pi r$, and the length of the arc included in an angle of 1 degree would be $$\frac{2\pi r}{360}$$

or $.01745\ r$.

Figure 14:
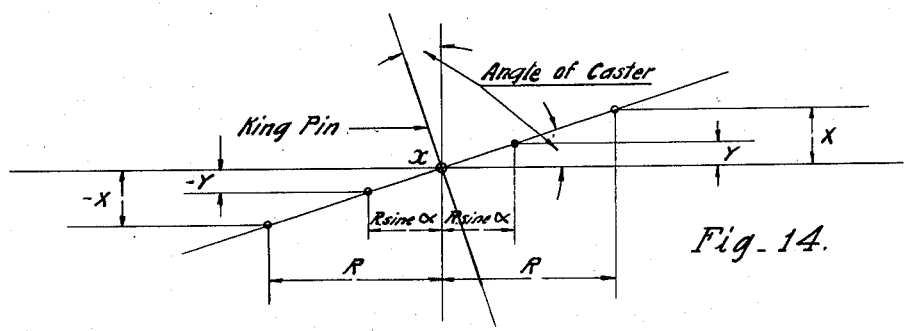
Figure 14 is a diagrammatic side view of the king pin shown in Figure 13 illustrating the path of movement thereabout of a point in the plane of the vehicle wheel.

Referring now to Figure 13, which is a plan view of an automobile wheel in straight ahead position, and Figure 14, which is a diagrammatic side view of the king pin shown in Figure 13 illustrating the path of movement thereabout of a point $x$ in the plane of the wheel, it will be seen that if the wheel is turned through an angle of 90 degrees from straight ahead position, its change of inclination due to the caster of the king pin will be equal to the angle of the caster. If, therefore, the wheel be turned through an angle of 90 degrees and the caster measuring device with it, the difference between the reading taken in straight ahead position and a reading taken in the 90 degree position would indicate the number of degrees of caster, which could be read directly on the scale if the graduations were spaced a distance $.01745\ r$.

In practice, however, as heretofore noted, it is impossible to turn most automobile wheels through an angle of 90 degrees so that some other angle must be selected and the scale modified accordingly. Any angle through which the wheel can be turned may be selected and such angle may be represented by $\alpha$.

Referring to Figures 13 and 14 again, it will be seen that when the wheel is turned through an angle of 90 degrees from its straight ahead position the point $x$ traverses a distance R and rises to its maximum height through a distance X. As has been noted above, the change of inclination of the wheel during such movement will be equal to the angle of caster. If the wheel be turned through only $\alpha$ degrees, then the horizontal distance traversed by point $x$ will be $R \sin \alpha$, and its vertical rise will be a distance Y. By geometry it may be shown that the distance $R \sin \alpha$ bears the same proportion to R as Y does to X. Therefore, $Y = \sin \alpha \cdot X$, thus indicating that when the wheel is turned through an angle of $\alpha$ degrees the change of inclination of the wheel is $\sin \alpha$ of the angle of caster. Since, as has been explained, I am proposing to turn the wheel through only $\alpha$ degrees it will, therefore, be necessary to take this factor into account in the derivation of the scale. Thus, since it is desired to read the total angle of caster by turning the wheel through an angle of only $\alpha$ degrees instead of 90 degrees, the scale divisions must be only $\sin \alpha$ of the spacing necessary to read the angle when the wheel is turned through 90 degrees. That is to say, the corrected spacing of the scale graduations will be $\sin \alpha \cdot .01745\ r$.

Although in the above illustration it has been assumed that the wheel is turned through an angle of $\alpha$ degrees to one side only of straight ahead position, it is desirable, as has been heretofore explained, that the angle through which the wheel is turned be as large as possible in order to secure a maximum spacing for the scale graduations. Since the wheel can be turned through equal angles to each side of straight ahead position, it will be seen that if it be turned through an angle of $\alpha$ degrees to each side of straight ahead position then the corrected spacing of the scale graduations for this condition would be $2 \sin \alpha \cdot .01745\ r$.

There is another condition, however, which must be taken into account in deriving the scale, and this is due to the scale being held in stationary position while the wheel is turned so that the angle of wheel inclination actually measured is not the true angle of inclination. This may be seen by reference to Figure 15, which is illustrative of this condition and the manner of taking it into account.

Figure 15:
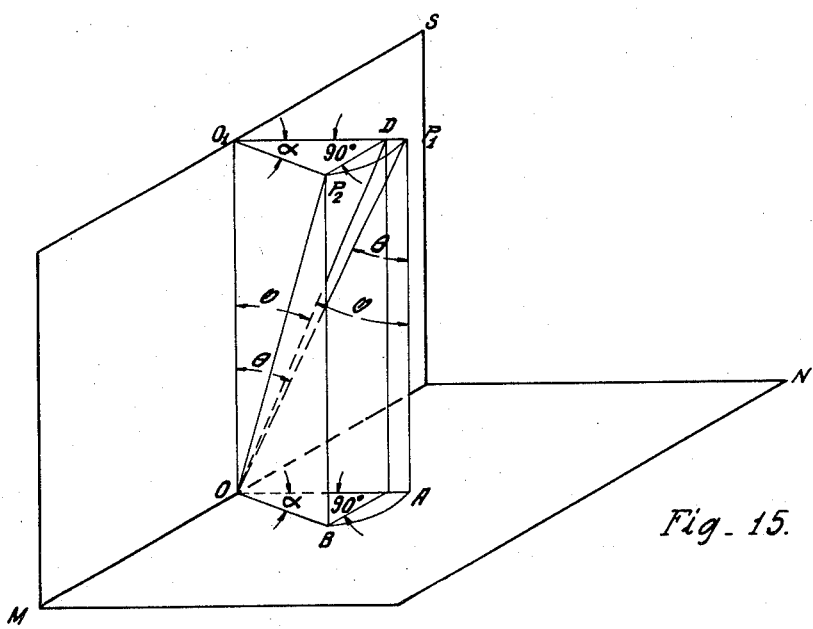
Figure 15 is a geometric figure illustrating the manner of computing the spacing of the caster scale graduations.

In Figure 15 the plane MN is the horizontal plane passing through the base of the scale which is the reference plane from which measurements are taken. The line $OO_1$ is vertical and perpendicular to the plane MN and lies in a plane MS also perpendicular to the plane MN. This line will be used as a reference line for making computations. The line $OP_1$ represents the inclination of the face of the gauge member 13 when disposed at some angle from the vertical such as $\Theta$, and the point $P_1$ may be any point in the plane of the face of the gauge member. The point $P_1$ is at a distance $AP_1$ from the horizontal plane MN and a distance $O_1P_1$ from the vertical line $OO_1$. The angle $OP_1A$ is represented by $\Theta$. The caster measuring scale lies in the plane $OO_1P_1A$ which is perpendicular to the plane of the face of the vehicle wheel when in straight ahead position.

Suppose now that there is a relative change of angular position between the planes $OO_1P_1A$ and MS of $\alpha$ degrees, as when the vehicle wheel is turned through $\alpha$ degrees to one side of straight ahead position. This may be illustrated in the figure either by rotating the plane MS through the angle $\alpha$ or by rotating the plane $OO_1P_1A$ through the angle $\alpha$ and for ease of illustration the latter method is adopted. The point $P_1$ will now assume the position $P_2$ and the point A will move to B and these points will now lie at a different distance from the plane MS. This distance may be determined by projecting the points $P_2$ and B onto the plane $OO_1P_1A$ so that projected point $P_2$ is represented by D and projected point B is represented by C. The distance OC is, therefore, equal to OB $\cos \alpha$ and the line OD assumes an angle $\varphi$ with the vertical. It will thus be seen that in actual practice since the caster scale is in fixed position in the plane $OO_1P_1A$, when the wheel is rotated through an angle $\alpha$ the angle of wheel inclination indicated on the scale is $\varphi$, whereas the true angle is $\Theta$ and this condition must be taken into account in deriving the scale which must be adapted to indicate the angle $\Theta$ when measuring the angle $\varphi$.

For this purpose it is necessary to determine the relation between the angles $\Theta$ and $\varphi$, which may be done in the following manner:

By trigonometry $$\frac{OA}{AP_1} = \tan \Theta$$

and $$\frac{OC}{CD} = \tan \varphi$$

but since $$OC = OB \cos \alpha = OA \cos \alpha$$

and $$CD = AP_1$$

Therefore $$\frac{OA \cos \alpha}{AP_1} = \tan \varphi$$

and $$\tan \Theta \cos \alpha = \tan \varphi$$

or $$\tan \Theta = \frac{\tan \varphi}{\cos \alpha}$$

In other words the last equation indicates that the tangent of the angle which I want the caster scale to indicate is equal to the tangent of the angle actually measured divided by cos $\alpha$. This value is, therefore, another correction factor which must be taken into account in deriving the scale.

It has heretofore been demonstrated that if the vehicle wheel could be turned through 90 degrees from straight ahead position, and the caster scale with it, the proper spacing of the scale graduations would be .01745 $r$. However, since the wheel is only turned through $\alpha$ degrees this value must be multiplied by sin $\alpha$ and further since the caster scale remains stationary the result must be divided by cos $\alpha$. The proper spacing for the scale graduations in order to permit the angle of caster to be directly read from the scale is, therefore, $$\frac{\sin \alpha \cdot .01745 \, r}{\cos \alpha}$$

If the wheel is turned through $\alpha$ degrees to each side of straight ahead position, as is preferably done, then the proper spacing of the scale graduations should be $$\frac{2 \sin \alpha \cdot .01745 \, r}{\cos \alpha}$$

Using this equation to determine the spacing of the caster scale graduations, if the same values are used for $\alpha$ and $r$ as were used in the trial method, then the proper spacing of the scale graduations should be $$\frac{2 \cdot .845 \cdot .01745 \cdot 14.236}{.9063} = .233 \text{ inch,}$$

which is the same result found by the trial method.

In some instances, it may be desirable to take the measurements from the wheel fellies rather than from the outer faces of the wheels as heretofore described, and for this purpose removable gauge pins 34 may be provided as shown in Figure 5. The gauge pins to be used on the vertical gauging member 13 are carried by plates 35 which are adapted to be placed against the inner surface of the gauging member and adjustably held in position by threaded bolts 36 passing through elongated slots 37 and screwed into threaded bores 38 provided in the gauging members 13 for that purpose. The gauge pins to be used on the gauge plates 24 are carried by yokes 39 adapted to fit over the gauge plates and to be held in position by thumb screws 40.

In the operation of the apparatus, the vehicle whose wheels are to be tested for alignment is driven into testing position on the apparatus with its front wheels resting on the turntables 3 and in straight ahead position. The aligning assemblies are then moved up to the vehicle wheels and the hand wheels 16 adjusted until the gauging members 13 are brought into contact with the top and bottom faces of the wheel, or until the pins 34 contact with the wheel felly when it is desired to take measurements from the felly. This operation also brings the horizontal arms 20 into parallelism with the outer faces of the wheels so that the gauge plates 24 bear against opposite sides of the wheels. The position of the gauge plates may be adjusted to suit the size wheels being tested. The camber of the wheels is now indicated on the graduations A on the scales and the toe in is indicated on the scales 21.

Assuming that the caster scale has been derived by turning the vehicle wheel through 50 degrees in the trial method, or that the spacing of the scale graduations have been computed on the basis that $\alpha$ equals 25 degrees, the caster is now determined by turning the vehicle wheels 25 degrees to one side of their straight ahead position and again adjusting the hand wheels 16 until the gauge members 13 and the gauge plates 24 are again placed parallel with the outer faces of the wheels. The value indicated by the indicator 32 on the graduations B of scale 31 is now noted. The wheels 2 are then turned to a position 25 degrees to the opposite side of their straight ahead position and the hand wheels 16 are adjusted to bring the gauge members 13 and gauge plates 29 into parallelism with the outer faces of the wheels and the value indicated by the indicator 32 on the graduations B of scale 31 is compared with the value previously noted. The difference between these two values is the caster in degrees.

It will be understood that if the caster scale has been derived by turning the vehicle wheel through some angle other than 50 degrees in the trial method, or the spacing of the scale graduations has been computed on the basis of some other value for $\alpha$ than 25 degrees, then in determining the caster the vehicle wheel must be turned through the angle used in deriving the scale in order to correctly read the caster angle. For example, if in deriving the scale $\alpha$ has been taken to be say 20 degrees, then in testing a vehicle wheel with this scale the readings should be taken when the wheel is turned 20 degrees to each side of straight ahead position.

If it is found that amounts of camber, toe in, and caster are not correct, the proper adjustments may now be made to correct them.

To measure the toe out on the curve it is first necessary to know the wheel base of the vehicle undergoing the test, since the toe out on the curve is directly dependent upon this factor. Suppose, for example, that the vehicle has a wheel base of 126 inches. Knowing this an alignment assembly is brought into testing relation with one of the front wheels, say for example, the left front wheel, when in straight ahead position, that is to say, the aligning assembly is moved up to the wheel so that gauge plates 24 bear against opposite sides of the wheel and the gauging member 13 contacts with the top and bottom faces.

The wheels are not turned until the right front wheel shows a 20 degree turn to the left on scale 21. The other aligning assembly is now moved into testing relation with the left wheel and unless the wheels are improperly aligned the indicator 23 on the left hand scale 21 should indicate 23 degrees. If some other reading is indicated this shows that the left spindle arm is bent out of shape.

It will be understood, of course, that the value of 23 degrees on the left wheel is proper only for a vehicle having a 126 inch wheel base, as the proper degree of toe out varies according to the wheel base of the vehicle being tested. The operations above described for testing toe out on the curve would be, of course, reversed in checking the wheels in the opposite turn.

Having now described my invention and in what manner the same may be used, what I claim as new and desire to protect by Letters Patent is:

1. The method of determining the caster of a dirigible vehicle wheel which comprises measuring the inclination from the vertical of said wheel from its face, turning said wheel through a predetermined angle, again measuring the inclination from the vertical of said wheel from its face, both of said measurements being taken in a common plane perpendicular to the plane of the wheel when in straight ahead position, and comparing said measurements to determine the caster of the wheel in degrees.

2. The method of determining the caster of a dirigible vehicle wheel which comprises measuring the inclination from the vertical of said wheel from its face, turning said wheel through a predetermined angle, again measuring the inclination from the vertical of said wheel from its face, both of said measurements being taken in a common plane perpendicular to the plane of the wheel in straight ahead position, and subtracting said measurements, the units of measurement used being such that the difference between said measurements represents the caster of the wheel in degrees.

3. The method of determining the caster of a dirigible vehicle wheel which comprises measuring the inclination from the vertical of said wheel from its face when disposed at an angle to one side of its straight ahead position, turning said wheel to a corresponding angular position on the opposite side of its straight ahead position, again measuring the inclination from the vertical of said wheel from its face, both of said measurements being taken in a common plane perpendicular to the plane of the wheel when in straight ahead position, and comparing said measurements to determine the caster of the wheel in degrees.

JAMES W. MORSE.